United States Patent [19]

Tajima et al.

[11] Patent Number: 5,643,845
[45] Date of Patent: Jul. 1, 1997

[54] CATALYST COMPONENTS FOR POLYMERIZATION OF OLEFINS

[75] Inventors: Yoshio Tajima; Naoki Kataoka; Yosuke Numao; Takashi Seki; Kazuo Matsuura, all of Yokohama, Japan

[73] Assignee: Nippon Oil Co., Ltd., Tokyo, Japan

[21] Appl. No.: 334,835

[22] Filed: Nov. 4, 1994

Related U.S. Application Data

[63] Continuation of Ser. No. 904,803, Jun. 26, 1992, Pat. No. 5,387,567.

[30] Foreign Application Priority Data

Jun. 27, 1991 [JP] Japan .................................. 3-183271
Sep. 27, 1991 [JP] Japan .................................. 3-276672

[51] Int. Cl.$^6$ .................................................... B01J 31/00
[52] U.S. Cl. .......................... 502/103; 502/108; 502/117; 502/118; 526/128; 526/159; 526/160; 526/165; 526/903
[58] Field of Search .......................... 502/103, 108, 502/112, 117, 118; 526/128, 903, 160, 159, 165

[56] References Cited

U.S. PATENT DOCUMENTS

| | | | |
|---|---|---|---|
| 3,205,216 | 9/1965 | McManimie et al. | 526/159 |
| 3,239,497 | 3/1966 | Machida et al. | 502/108 X |
| 3,257,332 | 6/1966 | Ziegler et al. | 526/159 X |
| 3,278,511 | 10/1966 | Langer, Jr. | 526/903 X |
| 3,340,244 | 9/1967 | Coover, Jr. et al. | 526/903 X |
| 4,008,176 | 2/1977 | Rust et al. | 502/108 X |
| 4,008,177 | 2/1977 | Rust et al. | 502/108 X |
| 4,368,302 | 1/1983 | Downs | 502/108 X |
| 4,396,534 | 8/1983 | Matsuura et al. | 502/102 |
| 4,468,477 | 8/1984 | Caunt et al. | 502/108 X |
| 4,659,685 | 4/1987 | Coleman, III et al. | 502/117 X |
| 4,701,432 | 10/1987 | Welborn, Jr. | 502/117 X |
| 4,937,299 | 6/1990 | Ewen et al. | 502/117 X |
| 5,021,382 | 6/1991 | Malpass, Jr. | 502/108 X |
| 5,032,562 | 7/1991 | Lo et al. | 502/117 X |
| 5,120,696 | 6/1992 | Tsutsui et al. | 502/108 X |
| 5,451,555 | 9/1995 | Tajima et al. | 526/160 X |

FOREIGN PATENT DOCUMENTS

| | | |
|---|---|---|
| 0283739 | 9/1988 | European Pat. Off. . |
| 0311449 | 4/1989 | European Pat. Off. . |
| 0433987 | 6/1991 | European Pat. Off. . |
| 0441620 | 8/1991 | European Pat. Off. . |
| 1720785 | 7/1971 | Germany . |
| 5819309 | 2/1983 | Japan . |
| 63-251405 | 10/1988 | Japan . |

OTHER PUBLICATIONS

European Search Report for European Application No. EP 92 30 5894, dated Dec. 17, 1992, 3 pages.

*Primary Examiner*—Fred Teskin
*Attorney, Agent, or Firm*—Panitch Schwarze Jacobs & Nadel, P.C.

[57] ABSTRACT

A catalyst component is disclosed for use in the homo- or copolymerization of olefinic hydrocarbons. The catalyst component is comprised of a first compound of the formula $Me^1(OR^1)_p R^2_q X^1_{4-p-q}$ and a second compound which is an organocyclic compound having two or more conjugated double bonds. A process is also disclosed for the production of hydrocarbon polymers in which the above catalyst component is combined with a modified or organoaluminum compound to form a catalyst composition capable of providing high molecular weight, wide distribution thereof and other desirable qualities in the polymer product.

18 Claims, No Drawings

CATALYST COMPONENTS FOR POLYMERIZATION OF OLEFINS

CROSS-REFERENCE TO RELATED APPLICATION

This is a continuation of application Ser. No. 07/904,803, filed Jun. 26, 1992, now U.S. Pat. No. 5,387,567 issued Feb. 7, 1995.

BACKGROUND OF THE INVENTION

1. Field of the Invention

This invention relates to catalyst components for use in the polymerizaion of olefinic hydrocarbons. The invention is also directed to a process for the manufacture of olefinic polymers in which the aforesaid catalyst components are employed.

2. Prior Art

Catalyst compositions comprising zirconium compounds, typically metailocene, and alumoxane are known for use in the homopolymerization of olefins such as ethylene or the copolymerization of ethylene/alpha-olefins as disclosed for example in Japanese Laid-Open Patent Publication No. 58-19309. While the disclosed prior art process is advantageous so far as concerns the availability of polymerized products at increased rate of yield, it has a drawback in that the polymers obtained have a relatively low molecular weight and further that they, if homopolymeric, have a relatively narrow molecular weight distribution. When taking into account the molecular weight alone, it would be possible to increase the molecular weight of a polymer to some extent by making a proper selection of transition metals from among the group of metallocene. It has been proposed to use dicyclopentadienyl hafnium as disclosed for example in Japanese Laid-Open Patent Publication No. 63-251405. However, hafnium compounds are not only difficult to synthesize but also less active compared to dicyclopentadienyl zirconium. The use of dicyclopentadienyl hafnium would not provide any appreciable increase in the breadth of molecular weight distribution of the polymer produced, or would not help in providing sufficiently narrow composition distribution of the polymer when the latter is a copolymer.

SUMMARY OF THE INVENTION

With the foregoing drawbacks of the prior art in view, the present invention seeks to provide novel catalyst components which, when combined with a promoter such as an organoaluminum compound, will greatly contribute to the production of polyolefins having a relatively wide molecular weight distribution and a relatively narrow composition distribution where the polyolefin is a copolymer.

The invention also seeks to provide a process for the homopolymerization or copolymerization of olefinic hydrocarbons in which there is used a catalyst composition comprising a novel catalyst component and a promoter which has enhanced catalytic activity per given transition metal and is capable of providing olefinic polymers having a relatively high molecular weight.

According to the invention, there is provided a catalyst component comprising a compound (A) of the formula

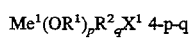

where $R^1$ and $R^2$ each are hydrocarbon moieties of 1–24 carbon atoms; $X^1$ is a halogen atom; $Me^1$ is Ti, Zr or Hf; p is $0 \leq p \leq 4$; q is $0 \leq q \leq 4$; and p+q is $0 \leq p+q \leq 4$, and an organocyclic compound (B) having two or more conjugated double bonds.

A polymerization process according to the invention comprises homopolymerizing or copolymerizing olefinic hydrocarbons in the presence of a catalyst composition comprising a catalyst component comprising a compound (A) of the formula

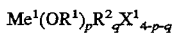

where $R^1$ and $R^2$ each are hydrocarbon moieties of 1–24 carbon atoms; $X^1$ is a halogen atom; $Me^1$ is Ti, Zr or Hf; p is $0 \leq p \leq 4$; p is $0 \leq q \leq 4$; and p+q is $0 \leq p+q \leq 4$, and an organocyclic compound (B) having two or more conjugated double bonds, and a modified organoaluminum compound having Al—O—Al bonds.

It has now been found that in addition to the above mentioned features, the use of the inventive catalyst component provides a copolymer, typically an ethylene/alpha-olefin copolymer, which may be formed into sheets or films that are free from sticking with each other.

DETAILED DESCRIPTION OF THE INVENTION

The catalyst component of the invention is, as above described, comprised of Compound (A) and Compound (B) which are contacted together.

Compound (A) is represented by the general formula

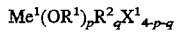

$R^1$ and $R^2$ respectively designate separate hydrocarbon moieties each having a carbon number 1–24, preferably 1–12, more preferably 1–8, which include alkyl groups such as methyl, propyl, butyl, pentyl, hexyl and octyl, alkenyl groups such as vinyl and allyl, aryl groups such as phenyl, tolyl and xylyl and aralkyl groups such as benzyl, phenethyl styryl and neophyl. If there are more than two members $R^1$ and $R^2$, they may be the same or different.

$X^1$ is a halogen atom such as fluorine, iodine, chlorine and bromine. $Me^1$ designates zirconium Zr, titanium Ti and hafnium Hf, of which Zr is preferred. p is $0 \leq p \leq 4$, preferably $0 \leq p \leq 4$; q is $0 \leq q \leq 4$, preferably $0 < q \leq 4$; and p+q is $0 \leq p+q \leq 4$, preferably $0 < p+q \leq 4$;

Specific examples of Compound (A) include tetramethyl zirconium, tetraethyl zirconium, tetrapropyl zirconium, tetra-n-butyl zirconium, tetrapentyl zirconium, tetraphenyl zirconium, tetratolyl zirconium, tetrabenzyl zirconium, tetraallyl zirconium, tetraneophyl zirconium, trimethylmonochlorozirconium, triethylmonochlorozirconium, tripropylmonochlorozirconium, tri-n-butylmonochlorozirconium, tribenzylmonochlorozirconium, dimethyldichlorozirconium, diethyldichlorozirconium, di-n-butyldichlorozirconium, dibenzyldichlorozirconium, monomethyltrichlorozirconium, monoethyltrichlorozirconium, mono-n-butyltrichlorozirconium, monobenzyltrichlorozirconium, tetrachlorozirconium, trimethylmonobromozirconium, -triethylmonobromozirconium, tripropylmonobromozirconium, tri-n-butylmonobromozirconium, tribenzylmonobromozirconium diethyldibromozirconium, di-n-butyldibromozirconium, dibenzyldibromozirconium, monomethyltribromozirconium, monoethyltribromozirconium, mono-n- butyltribromozirconium, monobenzyltribromozirconium, tetrabromozirconium, trimethylmonoiodozirconium, triethylmonoiodozirconium, tripropylmonoiodozirconium, tri-n-butylmonoiodozirconium, tribenzylmonoiodozirconium, dimethyldiiodozirconium, diethyldiiodozirconium, di-n-butyldiiodozirconium, dibenzyldiiodozirconium, monomethyltriiodozirconium, monoethyltriiodozirconium, mono-n-butyltriiodozirconium, monobenzyltriiodozirconium, tetraiodozirconium, tetramethoxyzirconium, trimethoxymonochlorozirconium, dimethoxydichlorozirconium, monomethoxytrichlorozirconium, tetraethoxyzirconium, triethoxymonochlorozirconium, diethoxydichlorozirconium, monoethoxytrichlorozirconium, tetraisopropoxyzirconium, triisopropoxymonochlorozirconium, diisopropoxydichlorozirconium, monoisopropoxytrichlorozirconium, tetra-n-butoxyzirconium, tri-n-butoxymonochlorozirconium, di-n-butoxydichlorozirconium, mono-n-butoxytrichlorozirconium, tetrapentoxyzirconium, tripentoxymonochlorozirconium, dipentoxydichlorozirconium, monopentoxytrichlorozirconium, tetraphenoxyzirconium, triphenoxymonochlorozirconium, diphenoxydichlorozirconium, monophenoxytrichlorozirconium, tetratolyoxyzirconium, tritolyoxymonochlorozirconium, ditolyloxydichlorozirconium, monotolyloxytrichlorozirconium, tetrabenzyloxyzirconium, tribenzyloxymonozirconium, dibenzyloxydichlorozirconium, monobenzyloxytrichlorozirconium, tribenzylmonomethoxyzirconium, tribenzylmonoethoxyzirconium, tribenzylmonopropoxyzirconium, tribenzylmonobutyoxyzirconium, tribenzylmonophenoxyzirconium, dibenzyldimethoxyzirconium, dibenzyldiethoxyzirconium, dibenzyldipropoxyzirconium, dibenzyldibutyoxyzirconium, dibenzyldiphenoxyzirconium, monobenzyltrimethoxyzirconium, monobenzyltriethoxyzirconium, monobenzyltripropoxyzirconium, monobenzyltributyoxyzirconium, monobenzyltriphenoxyzirconium, trineophylmonomethoxyzirconium, trineophylmonoethoxyzirconium, trineophylmonopropoxyzirconium, trineophylmonobutyoxyzirconium, trineophylmonophenoxyzirconium, dineophyldimethoxyzirconium, dineophyldiethoxyzirconium, dineophyldipropoxyzirconium, dineophyldibutyoxyzirconium, dineophyldiphenoxyzirconium, mononeophyltrimethoxyzirconium, mononeophyltriethoxyzirconium, mononeophyltripropoxyzirconium, mononeophyltributyoxyzirconium, mononeophyltriphenoxyzirconium, tetramethyl titanium, tetraethyl titanium, tetrapropyl titanium, tetra-n-butyl titanium, tetrapentyl titanium, tetraphenyl titanium, tetratolyl titanium, tetrabenzyl titanium, tetraallyl titanium, tetraneophyl titanium, trimethylmonochlorotitanium, triethylmonochlorotitanium, tripropylmonochlorotitanium, tri-n-butylmonochlorotitanium, tribenzylmonochlorotitanium, dimethyldichlorotitanium, diethyldichlorotitanium, di-n-butyldichlorotitanium, dibenzyldichlorotitanium, monomethyltrichlorotitanium, monoethyltrichlorotitanium, mono-n-butyltrichlorotitanium, monobenzyltrichlorotitanium, tetrachlorotitanium, trimethylmonobromotitanium, triethylmonobromotitanium, tripropylmonobromotitanium, tri-n-butylmonobromotitanium, tribenzylmonobromotitanium, dimethyldibromotitanium, diethyldibromotitanium, di-n-butyldibromotitanium, dibenzyldibromotitanium, monomethyltribromotitanium, monoethyltribromotitanium, mono-n-butyltribromotitanfum, monobenzyltribromotitanium, tetrabromotitanium, trimethylmonoiodotitanium, triethylmonoiodotitanium, tripropylmonoiodotitanium, tri-n-butylmonoiodotitanium, tribenzylmonoiodotitanium, dimethyldiiodotitanium, diethyldiiodotitanium, di-n-butyldiiodotitanium, dibenzyldiiodotitanium, monomethyltriiodotitanium, monoethyltriiodotitanium, mono-n-butyltriiodotitanium, monobenzyltriiodotitanium, tetraiodotitanium, tetramethoxytitanium, trimethoxymonochlorotitanium, dimethoxydichlorotitanium, monomethoxytrichlorotitanium, tetraethoxytitanium, triethoxymonochlorotitanium, diethoxydichlorotitanium, monoethoxytrichlorotitanium, tetraisopropoxytitanium, triisopropoxymonochlorotitanium, diisopropoxydichlorotitanium, monoisopropoxytrichlorotitanium, tetra-n-butoxytitanium, tri-n-butoxymonochlorotitanium, di-n-butoxydichlorotitanium, mono-n-butoxytrichlorotitanium, tetrapentoxytitanium, tripentoxymonochlorotitanium, dipentoxydichlorotitanium, monopentoxytrichlorotitanium, tetraphenoxytitanium, triphenoxymonochlorotitanium, diphenoxydichlorotitanium, monophenoxytrichlorotitanium, tetratolyloxytitanium, tritolyloxymonochlorotitanium, ditolyloxydichlorotitanium, monotolyloxytrichlorotitanium, tetrabenzyloxytitanium, tribenzyloxymonotitanium, dibenzyloxydichlorotitanium, monobenzyloxytrichlorotitanium, tribenzylmonomethoxytitanium, tribenzylmonoethoxytitanium, tribenzylmonopropoxytitanium, tribenzylmonobutyoxytitanium, tribenzylmonophenoxytitanium, dibenzyldimethoxytitanium, dibenzyldiethoxytitanium, dibenzyldipropoxytitanium, dibenzyldibutyoxytitanium, dibenzyldiphenoxytitanium, monobenzyltrimethoxytitanium, monobenzyltriethoxytitanium, monobenzyltripropoxytitanium, monobenzyltributyoxytitanium, monobenzyltriphenoxytitanium, trineophylmonomethoxytitanium, trineophylmonoethoxytitanium, trineophylmonopropoxytitanium, trineophylmonobutyoxytitanium, trineophylmonophenoxytitanium, dineophyldimethoxytitanium, dineophyldiethoxytitanium, dineophyldipropoxytitanium, dineophylibutyoxytitanium, dineophyldiphenoxytitanium, mononeophyltrimethoxytitanium, mononeophyltriethoxytitanium, mononeophyltripropoxytitanium, mononeophyltributyoxytitanium, mononeophyltriphenoxytitanium, tetramethyl hafnium, tetraethyl hafnium, tetrapropyl hafnium, tetra-n-butyl hafnium, tetrapentyl hafnium, tetraphenyl hafnium, tetratolyl hafnium, tetrabenzyl hafnium, tetraallyl hafnium, tetraneophyl hafnium, trimethylmonochlorohafnium, triethylmonochlorohafnium, tripropylmonochlorohafnium, tri-n-butylmonochlorohafnium, tribenzylmonochlorohafnium, dimethyldichlorohafnium, diethyldichlorohafnium, di-n-butyldichlorohafnium, dibenzyldichlorohafnium, monomethyltrichlorohafnium, monoethyltrichlorohafnium, mono-n-butyltrichlorohafnium, monobenzyltrichlorohafnium, tetrachlorohafnium, trimethylmonobromohafnium, triethylmonobromohafnium, tripropylmonobromohafnium, tri-n-butylmonobromohafnium, tribenzylmonobromohafnium, dimethyldibromohafnium, diethyldibromohafnium, di-n-butyldibromohafnium, dibenzyldibromohafnium, monomethyltribromohafnium, monoethyltribromohafnium, mono-n-butyltribromohafnium, monobenzyltribromohafnium, tetrabromohafnium, trimethylmonoiodohafnium, triethylmonoiodohafnium, tripropylmonoiodohafnium, tri-n-butylmonoiodohafnium, tribenzylmonoiodohafnium, dimethyldiiodohafnium, diethyldiiodohafnium, di-n-butyldiiodohafnium, dibenzyldiiodohafnium, monomethyltriiodohafnium, monoethyltriiodohafnium, mono-n-butyltriiodohafnium, monobenzyltriiodohafnium, tetraiodohafnium, tetramethoxyhafnium, trimethoxymonochlorohafnium, dimethoxydichlorohafnium, monomethoxytrichlorohafnium, tetraethoxyhafnium, triethoxymonochlorohafnium, diethoxydichlorohafnium, monoethoxytrichlorohafnium, tetraisopropoxyhafnium, triisopropoxymonochlorohafnium, diisopropoxydichlorohafnium, monoisopropoxytrichlorohafnium, tetra-n-butoxyhafnium, tri-n-butoxymonochlorohafnium, di-n-butoxydichlorohafnium, mono-n-butoxytrichlorohafnium, tetrapentoxyhafnium, tripentoxymonochlorohafnium, dipentoxydichlorohafnium, monopentoxytrichlorohafnium, tetraphenoxyhafnium, triphenoxymonochlorohafnium, diphenoxydichlorohafnium, monophenoxytrichlorohafnium, tetratolyloxyhafnium, tritolyloxymonochlorohafnium, ditolyloxydichlorohafnium, monotolyloxytrichlorohafnium, tetrabenzyloxyhafnium, tribenzyloxymonohafnium, dibenzyloxydichlorohafnium, monobenzyloxytrichlorohafnium, tribenzylmonomethoxyhafnium, tribenzylmonoethoxyhafnium, tribenzylmonopropoxyhafnium, tribenzylmonobutyoxyhafnium, tribenzylmonophenoxyhafnium, dibenzyldimethoxyhafnium, dibenzyldiethoxyhafnium, dibenzyldipropoxyhafnium, dibenzyldibutyoxyhafnium, dibenzyldiphenoxyhafnium, monobenzyltrimethoxyhafnium, monobenzyltriethoxyhafnium, monobenzyltripropoxyhafnium, monobenzyltributyoxyhafnium, monobenzyltriphenoxyhafnium, trineophylmonomethoxyhafnium, trineophylmonoethoxyhafnium, trineophylmonopropoxyhafnium, trineophylmonobutyoxyhafnium, trineophylmonophenoxyhafnium, dineophyldimethoxyhafnium, dineophyldiethoxyhafnium, dineophyldipropoxyhafnium, dineophyldibutyoxyhafnium, dineophyldiphenoxyhafnium, mononeophyltrimethoxyhafnium, mononeophyltriethoxyhafnium, mononeophyltripropoxyhafnium, mononeophyltributyoxyhafnium, mononeophyltriphenoxyhafnium and the like.

Compound (B) is an organocyclic compound having two or more conjugated double bonds, examples of which include a cyclic hydrocarbon compound having two or more, preferably 2–4, more preferably 2–3 conjugated double bonds and a total carbon number of 4–24, preferably 4–12; said cyclic hydrocarbon compound partially substituted with 1–6 hydrocarbon moieties, typically alkyl or aralkyl groups of 1–12 carbon atoms; an organosilicon compound having two or more, preferably 2–4, more preferably 2–3 conjugated double bonds and cyclic hydrocarbon groups having a total carbon number of 4–24, preferably 4–12; and an organosilicon compound having said cyclic hydrocarbon groups partially substituted with 1–6 hydrocarbon moieties.

The organosilicon compound referred to above may be represented by the general formula $$(Cp)_L SiR_{4-L}$$

where Cp is a cyclic hydrocarbon group such as cyclopentadienyl, substituted cyclopentadienyl, indenyl and substituted indenyl groups; R is a hydrocarbon moiety of 1–24, preferably 1–12 carbon atoms exemplified by an alkyl group such as methyl, ethyl, propyl, isopropyl, butyl, t-butyl hexyl and octyl, an alkoxy group such as methoxy, ethoxy, propoxy and butoxy, an aryl group such as phenyl, an aryloxy group such as phenoxy, and an aralkyl group such as benzyl, or hydrogen; and L is $1 \leq L \leq 4$, preferably $1 \leq L \leq 3$.

Specific examples of Compound (B) include cyclopolyenes or substituted cyclopolyenes having 7–24 carbon atoms such as cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, cycloheptatriene, methylcycloheptatriene, cyclooctatetraene, methylcyclooctatetraene, azulene, ethylazulene, fluorene, methylfluorene; monocyclopentadienylsilane, dicyclopentadienylsilane, tricyclopentadienylsilane, tetracyclopentadienylsilane, monocyclopentadienylmonomethylsilane, monocyclopentadienylmonoethylsilane, monocyclopentadienyldimethylsilane, monocyclopentadienyldiethylsilane, monocyclopentadienyltrimethylsilane, monocyclopentadienyltriethylsilane, monocyclopentadienylmonomethoxysilane, monocyclopentadienylmonoethoxysilane, monocyclopentadienylmonophenoxysilane, dicyclopentadienylmonomethylsilane, dicyclopentadienylmonoethylsilane, dicyclopentadienyldimethylsilane, dicyclopentadienylmethylethylsilane, dicyclopentadienyldipropylsilane, dicyclopentadienylethylpropylsilane, dicyclopentadienyldiphenylsilane, dicyclopentadienylphenylmethylsilane, dicyclopentadienylmonomethoxysilane, dicyclopentadienylmonoethoxysilane, tricyclopentadienylmonomethylsilane, tricyclopentadienylmonoethylsilane, tricyclopentadienylmonomethoxysilane, tricyclopentadienylmonoethoxysilane, 3-methylcyclopentadienylsilane, bis-3-methylcyclopentadienylsilane, 3-methylcyclopentadienylmethylsilane, 1,2-dimethylcyclopentadienylsilane, 1,3-dimethylcyclopentadienylsilane, 1,2,4-trimethylcyclopentadienylsilane, 1,2,3,4-tetramethylcyclopentadienylsilane, pentamethylcyclopentadienylsilane, monoindenylsilane, diindenylsilane, triindenylsilane, tetraindenylsilane, monoindenylmonomethylsilane, monoindenylmonoethylsilane, monoindenyldimethylsilane, monoindenyldiethylsilane, monoindenyltrimethylsilane, monoindenyltriethylsilane, monoindenylmonomethoxysilane, monoindenylmonoethoxysilane, monoindenylmonophenoxysilane, diindenylmonomethylsilane, diindenylmonoethylsilane, diindenyldimethylsilane, diindenyldiethylsilane, diindenylmethylethylsilane, diindenyldipropylsilane, diindenylethylpropylsilane, diindenyldiphenylsilane, diindenylphenylmethylsilane, diindenylmonomethoxysilane, diindenylmonoethoxysilane, triindenylmonomethylsilane, triindenylmonoethylsilane, triindenylmonomethoxysilane, triindenylmonoethoxysilane, 3-methylindenyisilane, bis-3-methylindenylsilane, 3-methylindenylmethylsilane, 1,2-dimethylindenylsilane, 1,3-dimethylindenylsilane, 1,2,4-trimethylindenylsilane, 1,2,3,4-tetramethylindenylsilane, pentamethylindenylsilane and the like.

There may also be used certain compounds of the above which are bonded through alkyiene groups having typically 2–8, preferably 2–3 carbon atoms, examples of which include bisindenylethane, bis(4,5,6,7-tetrahydro-1-indenyl) ethane, 1,3-propandinyl-bis-indene, 1,3-propandinyl bisindene, 1,3-propandinyl bis(4,5,6,7-tetrahydro)indene, propylene bis(1-indene), isopropyl(1-indenyl) cyclopentadiene, diphenylmethylene(9-fluorenyl) cyclopentadiene, isopropylcyclopentadienyl-1-fluorene and the like.

The catalyst component of the invention is derived by mutual contact of Compounds (A) and (B) in a molar ratio (A):(B) of 1:0.01–100, preferably 1:0.1–10. There is no particular restriction as regards the manner in which the two compounds are contacted with each other. They may be contacted in an atmosphere of inert gas such as nitrogen or argon in the presence of a solvent of inert hydrocarbon such as heptane, hexane, benzene, toluene or xylene, at a temperature of about −100°–200° C., preferably −50°–100° C. for a duration of 30 minutes to 50 hours, preferably 1–24 hours. The resulting catalyst component can be readily put to use in the form of a solution, or can alternatively be used after it is solidified by suitable means and removed from the solution.

The inventive catalyst component is usually combined with a suitable promoter to form a catalyst composition for use in the homo- or co-polymerization of olefins. Such a promoter may be typically a modified organoaluminum compound or other commercially available promoter compounds which do not adversely affect the performance of the inventive catalyst component.

The term modified organoaluminum compound is used herein to designate a reaction product of an organoaluminum compound and water which has 1–100, preferably 1–50 Al—O—Al bonds in the molecule. This reaction is usually conducted in the presence of an inert hydrocarbon such as pentane, hexane, heptane, cyclohexane, methylcyclohexane, benzene, toluene and xylene, of which aliphatic and aromatic hydrocarbons are preferred. The starting organoaluminum compound may be represented by the formula

$$R_nAlX_{3-n}$$

where R is an alkyl, alkenyl, aryl or aralkyl group having a carbon number of 1–18, preferably 1–12; X is a hydrogen or halogen atom; and n is an integer of $1 \leq n \leq 3$.

The above compound is typically exemplified by trialkylaluminum having an alkyl group optionally such as methyl, ethyl, propyl, isopropyl, butyl, isobutyl, pentyl, hexyl, octyl, decyl and dodecyl groups, of which methyl group is particularly preferred.

The water/organoaluminum reaction takes place in a molar ratio of water:Al in the range of 0.25:1–1.2/1, preferably 0.5:1–1/1 at a temperature of usually −70°–100° C., preferably −20°–20° C. for a period of 5–24 hours, preferably 5–10 hours. As water for reaction with the organoaluminum compound, there may be used crystal water contained in hydrates of copper sulfate or aluminum sulfate.

The catalyst component and the modified organoaluminum compound may be supplied separately or as an admixture to the polymerization reaction system. They are used in a ratio such that the atomic ratio of aluminum in the organoaluminum compound to transition metal in the catalyst component remain in the range of 1–100,000, preferably 5 –1,000.

The term olefins as used herein designates alpha-olefins, cyclic olefins, dienes, trienes and styrene analogs. Alpha-olefins have a carbon number of 2–12, preferably 2–8 and typically include ethylene, propylene, butene-1, hexane-1 and 4-methylpentene-1. According to the invention, these olefins may be homopolymerized or copolymerized such as by alternating, random or block copolymerization process.

The copolymerization of alpha-olefins is carried out in any of the combinations of ethylene and alpha-olefins of 3–12, preferably 3–8 carbon atoms such as ethylene/propylene, ethylene/butene-1, ethylene/hexane-1 and ethylene/4-methylpentene-1, and propylene and alpha-olefins of 3–12, preferably 3–8 carbon atoms such as propylene/butene-1, propylene/4-methylpentene-1, propylene/4-methylbutene1, propylene/hexane-1 and propylene/octene-1. Alpha-olefins to be combined with ethylene and propylene respectively are used in an amount not exceeding 90 mol % of total monomers, e.g. less than 40 mol %, preferably less than 30 mol %, more preferably less than 20 mol % with ethylene copolymers, and 1–90 mol %, preferably 5–90 mol %, more preferably 10–70 mol % with propylene copolymers.

The cyclic olefins to be used in the invention are those having a carbon number of 3–24, preferably 3–18 such as for example cyclopentene, cyclobutene, cyclohexane, 3-methylcyclohexane, cyclooctane, cyclodecene, cyclododecene, tetracyclodecene, octacyclodecene, dicyclopentadiene, norboruene, 5-methyl-2-norbornene, 5-ethyl-2-norbornene, 5-isobutyl-2-norbornene, 5,6-dimethyl-2-norbornene, 5,5,6-trimethyl-2-norbornene and ethylydenenorbornene. These cyclic olefins are usually copolymerized with alpha-olefins, in which instance the cyclic olefin is present in an amount of less than 50 mol %, preferably 1–50 mol %, more preferably 2–50 mol %, obtained.

The term dienes and trienes as used herein designates a polyene having 4 to 26 carbons and having two or three double bonds which may be conjugated or unconjugated.

Specific examples of the above polyene include butadiene, 1,4-hexadiene, 1,5-hexadiene, 1,9-decadiene, 1,3-tetradecadiene, 2,6-dimethyl-1,5-heptadiene, 2-methyl-2,7-octadiene, 2,7-dimethyl-2,6-octadiene and 1,5,9-decatriene. These polyenes are usually copolymerized with the above-listed alpha-olefins, and their contents in the resultant copolymers remain in the range of 0.5–50 mol %, preferably 0.2–10 mol %.

The term styrene analogs as referred to herein designates styrene and derivatives thereof including t-butylstyrene, alpha-methylstyrene, p-methylstyrene, divinylbenzene, 1,1-diphenylethylene, N,N-dimethyl-p-aminoethylstyrene and N,N-diethyl-p-aminoethylstyrene.

The catalyst composition provided in accordance with the invention is suitably used for the homo- or co-polymerization of olefins and further for reforming the homopolymers or copolymers with use of certain polar monomers. Such polar monomers may be unsaturated carboxylic acid esters exemplified by methylacrylate, methylmethacrylate, butylmethacrylate, dimethylmaleate, diethylmaleate, monomethylmaleate, diethylfumarate and dimethylitaconate. The polar monomer contents in the reformed copolymer obtained are usually in the range of 0.1–10 mol %, preferably 0.2–2 mol %.

The polymerization reaction according to the invention is conducted in a slurry, solution or gas phase in the presence or absence of an inert hydrocarbon solvent such as an aliphatic hydrocarbon including hexane and heptane, an aromatic hydrocarbon including benzene, toluene and xylene, and an alicyclic hydrocarbon including cyclohexane, and methylcyclohexane, substantially without the presence of oxygen and water, at a temperature of 20°–200° C., preferably 50°–100° C. under a pressure of atmospheric –70 $kg/cm^2G$, preferably atmosphetic –20 $kg/cm^2G$, for a reaction time of 5 minutes to 10 hours, preferably 5 minutes to 5 hours.

While the molecular weight of the polymer product obtained may be adjusted to some extent by varying the polymerization temperature, the molar ratio of the catalyst and other polymerization parameters, it can be more effectively adjusted by introducing water into the reaction system.

Preparation of Modified Organoaluminum Compound (Methylalmoxane)

In a 300-ml three-necked flask equipped with an electromagnetic stirrer were placed 13 grams of copper sulfate and 50 ml of toluene. The mixture after being suspended was incorporated dropwise at 0° C. and over 2 hours with 150 ml of a 1 mmol/ml triethylaluminum solution. The reaction was effected at 25° C. for 24 hours. Filtration of the reaction mixture and subsequent evaporation of excess toluene gave 4 grams of methylalumoxane (MAO) in the form of a white crystal.

Each of the polymers obtained in the respective Inventive and Comparative Examples given below was tested for the following items of property.

Melt Index (MI)

The procedure of ASTM D1238-57T was followed.

Density (D)

The procedure of ASTM D1505-68 was followed.

Melting Point by Calorimetry (DSC)

5 mg of the polymer sample was disposed at 180° C. for 3 minutes, cooled to 0° C. over 10° C./min and allowed to stand at 0° C. for 10 minutes, followed by heating with a temperature rise of 10° C./min with use of a melting point tester (Seiko Electronics DSC-20).

Molecular Weight Distribution (Mw/Mn)

This was measured by a gel permeation chromatography (Model 150-C manufactured by Waters Co.) at 135° C. with use of ortho-dichlorobenzene as solvent.

The invention will now be further described by way of the following examples.

INVENTIVE EXAMPLE 1

Preparation of Catalyst Component A01

Into a 300 c.c. three-necked flask were introduced 100 ml of toluene, followed by addition of 4.2 grams tetrapropoxyzirconium and 3.6 grams cyclopentadiene. The admixture was stirred to produce a solution of Catalyst Component A01. The experimental operation was conducted in nitrogen atmosphere.

Polymerization

To a 3-liter stainless steel autoclave purged with nitrogen were fed 300 ml of toluene, followed by addition of 3.6 ml of 1,5-hexadiene, 2 ml of 1 mmol/ml methylalumoxane and 0.2 mg of Catalyst Component A01 in terms of zirconium atoms. Ethylene was charged to bring the autoclave internal pressure up to 9 $kg/cm^2G$, whereupon the polymerization reaction was initiated at 30° C. and continued for 6 hours with continued charge of ethylene to maintain the reaction system at 9 $kg/cm^2G$.

Upon completion of the reaction, all excess gases were removed from the reactor which was then cooled until there was obtained an ethylene/1,5-hexadiene copolymer in an amount of 8 grams. The resulting copolymer had a density of 0.9276 $g/cm^3$, a melting point of 138.3° C. and an ethylene content of 97.9 mol %. Catalytic activity was represented by 40,000 grams copolymer/gram Zr.

INVENTIVE EXAMPLE 2

Preparation of Catalyst Component A02

Into a 300 c.c. three-necked flask were fed 75 ml of toluene, followed by addition of 6.7 grams of bis-indenylethane and 2.1 grams of tetrapropoxyzirconium. The admixture was stirred at room temperature until there was obtained a substantially homogeneous solution of Catalyst Component A02. The operation was conducted in nitrogen atmosphere.

Polymerization

A 3-liter stainless steel autoclave equipped with stirrer was purged with nitrogen and thereafter supplied with 300 ml of refined toluene, 10.0 ml of 1 mmol/ml methylalumoxane solution and 1.0 mg (as converted to zirconium atoms) of Catalyst Component A 02. The admixture was heated at 50° C. with stirring. The polymerization was initiated with a charge of a gas mixture propylene/butene-1 (propylene 85 mol %/butene-1 15 mol %) to bring the reactor pressure up to 5 kg/cm2G and continued for 2 hours with continued charge of the gas mixture to maintain that pressure. Upon completion of the reaction, all excess gases were removed, followed by addition of methanol to cause the reaction product to precipitate. The reaction product was washed with methanol and dried to yield 25 grams of a copolymer. The resulting copolymer had a butene-1 content of 9.6 mol % ($^{13}C$-MNR), a molecular weight distribution (Mw/Mn) of 4.2 (GPC) and an intrinsic viscosity of 0.6 dl/g. (135° C. tetralin). Catalytic activity was represented by 25,000 grams copolymer/gram Zr.

INVENTIVE EXAMPLE 3

Polymerization

A 3-liter stainless steel autoclave equipped with stirrer was purged with nitrogen and thereafter supplied with 300 ml of refined toluene, 11.0 ml of 1 mmol/ml methylalumoxane solution and 1.0 mg (as converted to zirconium atoms)

of Catalyst Component A02. The polymerization was initiated at 30° C. with a charge of ethylene to bring the reactor pressure up to 9 kg/cm$^2$G and continued with continued charge of ethylene to maintain that pressure. The reaction was further continued with addition of 25 ml of methylacrylate at 30° C. under a pressure of 9 kg/cm$^2$. Upon completion of the reaction, all excess gases were removed, and the reactor was cooled until there was obtained 4 grams of polymer. The polymer was dissolved in toluene, followed by addition of acetone to induce precipitation of the polymer which was then dried and formed (by press at 190° C. for 5 minutes) into a sheet 25 microns thick. The sheet was examined by infrared spectrometry to reveal an absorption spectrum peculiar to a carboxyl group at a wavelength of 1740 cm$^{-1}$. The polymer in dry state had a molecular weight distribution (Mw/Mn) of 4.8 (GPC) and an intrinsic viscosity of 1.7 dl/g. (135° C. tetralin). Catalytic activity was represented by 4,000 grams copolymer/gram Zr.

INVENTIVE EXAMPLE 4

Polymerization

A 3-liter stainless steel autoclave equipped with stirrer was purged with nitrogen and thereafter supplied with 300 ml of refined toluene, 5 ml of cyclopentene, 50.0 ml of 1 mmol/ml methylualmoxane solution and 1.0 mg (as converted to zirconium atoms) of Catalyst Component A02. Polymerization reaction was conducted at 30° C. for 24 hours. Ethylene was charged to bring the reactor pressure up to 3.5 kg/cm$^2$G. Reaction was re-started and continued for 1 hour with continued charge of ethylene to maintain the pressure at 3.5 kg/cm$^2$G. Upon completion of the reaction, all excess gases were removed, followed by addition of methanol to cause the reaction product to precipitate. The reaction product was washed with methanol and dried to yield 6 grams of a copolymer. The resulting copolymer had an ethylene content of 97.2 mol % ($^{13}$C-MNR), a molecular weight distribution (Mw/Mn) of 4.2 (GPC) and an intrinsic viscosity of 1.1 dl/g. (135° C. tetralin). Catalytic activity was represented by 2,000 grams copolymer/gram Zr.

INVENTIVE EXAMPLE 5

Preparation of Catalyst Component A03

Into a 300 c.c. three-necked flask were introduced 100 ml of toluene, followed by addition of 4.2 grams tetrapropoxyzirconium and 5.1 grams cyclopentadiene. The admixture was stirred at room temperature until there was obtained a homogeneous solution. The resulting solution was fed into a separate 300 ml three-necked flask together with 50 ml of a toluene solution of methylalumoxane (concentrated at 2 mmol/ml), followed by slow addition of 150 ml of refined n-hexane while the mixture was being stirred, thereby producing a solid precipitate. With the supernatant liquid removed, the precipitated product was dried in vacuum to form Catalyst Component A03.

Pre-polymerization

A 3-liter stainless steel autoclave with stirrer was nitrogen-purged, followed by addition of 100 ml of n-hexane and 2 grams of Catalyst Component A03. Ethylene was charged to effect preparatory polymerization at room temperature under ethylene pressure of 0.5 kg/cm$^2$ for 30 minutes.

Polymerization

To a 3-liter stainless steel autoclave purged with nitrogen were supplied 200 grams salt, 0.5 ml of isobutylalumoxane solution (concentrated at 1 mmol/ml) resulting from the reaction of triisobutylaluminum and water (Al:H$_2$O=1:0.5) and 0.14 gram of the product obtained in the above prepolymerization. The reaction system was heated at 60° C., followed by charging of ethylene to bring the system pressure up to 9 kg/cm$^2$G. Polymerization reaction was initiated at 9 kg/cm$^2$G and continued for 1 hour with continued ethylene charge to maintain that pressure. Upon completion of the reaction, all excess gases were removed and the reactor was cooled until there was obtained 32 grams white polymer. The resulting ethylene homopolymer had a melt index of 3.9 g/10 min and a molecular weight distribution of 4.5.

INVENTIVE EXAMPLE 6

Preparation of Catalyst ComPonent A04

Into a 300 ml three-necked flask were fed 75 ml of refined toluene, followed by addition of 3.6 grams of monocyclopentadienyl trimethylsilane and 2.1 grams of tetrapropoxyzirconium. The admixture was stirred until there was obtained a substantially homogeneous solution of Catalyst Component A04.

Polymerization

A 3-liter stainless steel autoclave equipped with stirrer was purged with nitrogen and thereafter supplied with 250 grams salt, 0.2 ml Catalyst Component A04 (toluene solution) and 0.8 ml of 1 mmol/ml methylalumoxane solution. Polymerization reaction was initiated with a charge of a gas mixture of ethylene/butene-1 (butene-1:ethylene molar ratio=0.25) to bring the reactor pressure up to 9 kg/cm$^2$G and continued for 1 hour with continued charge of the gas mixture to maintain that pressure. Upon completion of the reaction, all excess gases were removed and the reactor was cooled until there was obtained 23 grams polymer. The resulting ethylene/butene-1 copolymer had a melt index of 1.9 g/10 min, a density of 0.9236 g/cm$^2$, and a melting point of 114.9° C. Catalytic activity was represented by 16,000 grams copolymer/gram Zr.

INVENTIVE EXAMPLE 7

Preparation of Catalyst Component A05

A 300 ml three-necked flask was charged with 100 ml of toluene and 2.5 grams of indene and cooled at -60° C. thereby producing a solution (a). To a separate 100 ml flask were fed 50 ml of toluene, 4.2 grams of tetrabenzylzirconium (Zr(Bz)$_4$) and 1.6 grams of indene to prepare a solution (b). To the solution (a) was added the solution (b) over a period of 20 minutes, followed by stirring at -60° C. for 1 hour. The temperature of the admixture was raised slowly to 20° C. over 2 hours with continued stirring. Reaction of the admixture was effected at 45° C. for 3 hours with stirring until there was obtained Catalyst Component A05 which contained Zr of 5.4 mg/ml. The experimental operation was conducted completely in nitrogen atmosphere.

Into a 1-liter three-necked flask equipped with an electromagnetic induction type stirrer were charged 500 ml of diethylether solution containing 70 grams of benzylmagnesium chloride at 0° C. in nitrogen atmosphere. 30 grams of zirconium tetrachloride were added over 30 minutes in nitrogen atmosphere. The admixture was stirred for 2 hours with its temperature increased to room temperature, followed by addition of 300 ml decalin with stirring for another hour. The resulting magnesium chloride was isolated, and the decalin solution was heated at 50° C. with ether removed by a blast of nitrogen gas. Derived from the decalin solution were 32 grams of tetrabenzylzirconium.

Polymerization

A 3-liter stainless steel autoclave equipped with stirrer was purged with nitrogen and thereafter supplied with 200 grams of dry salt, 0.28 ml of Catalyst Component A05 and 16 ml of 1 mmol/ml methylalmoxane solution. The admixture was heated at 60° C. with stirring. Polymerization reaction was initiated with a charge of a gas mixture of ethylene/butene-1 (butene-1:ethylene molar ratio=0.25) to bring the reactor pressure up to 9 kg/cm$^2$G and continued for 1 hour with continued charge of the gas mixture (butene-1:ethylene molar ratio=0.05) to maintain that pressure. Upon completion of the reaction, all excess gases were removed, and the reactor was cooled until there was obtained a white copolymer.

INVENTIVE EXAMPLES 8–19

Preparation of Catalyst Components A06–A16

The procedure of Inventive Example 7 was followed in preparing Catalyst Components A06–A16 from the Compounds (A) and (B) listed in Table 1.
Polymerization The procedure of Inventive Example 7 was also followed in carrying out the copolymerization of ethylene and butene-1 with the exceptions that each of Catalyst Components A06–A16 was used in place of Catalyst Component A05 and that ethylene alone and propylene alone were homopolymerized in Inventive Examples 18 and 19, respectively. The amounts of Catalyst Components A06–A16 and the properties of the respective resultant polymers are indicated in Table 2.

Comparative Examples 1–9

Preparation of Catalyst Component B01

A 300 ml three-necked flask was charged with 100 ml of toluene and 4.2 grams of tetrabenzylzirconium. The admixture was stirred at room temperature until there was obtained Catalyst Component B01.
Preparation of Catalyst Components B02–B09

The procedure of Comparative Example 1 was followed except that transition metals listed in Table 1 were used in place of tetrabenzylzirconium.
Polymerization The procedure of Inventive Example 7 was followed in effecting the copolymerization of ethylene and butene-1 except that Catalyst Components B01–B09 were used in place of Catalyst Component A05. The amounts of the Catalyst Components used and the properties of the resultant polymers are shown in Table 2.

INVENTIVE EXAMPLE 20

Preparation of Catalyst Component A17

Into a 300 c.c. three-necked flask were fed 75 ml of toluene, followed by addition of 3.0 grams of indene and 2.1 grams of tetrapropoxyzirconium. The admixture was stirred at room temperature until there was obtained a substantially homogeneous solution of Catalyst Component A17 which contained Zr of 7.8 mg/ml.
Polymerization A 3-liter stainless steel autoclave equipped with stirrer was purged with nitrogen and thereafter supplied with 250 grams of dry salt, 18.6 ml of 1 mmol/ml methylalmoxane solution and 0.2 mg of Catalyst Component A17. The admixture was heated at 60° C. with stirring. Polymerization reaction was initiated with a charge of a gas mixture of ethylene/butene-1 (butene-1:ethylene molar ratio=0.25) to bring the reactor pressure up to 9 kg/cm$^2$G and continued for 1 hour with continued charge of the gas mixture (butene-1:ethylene molar ratio=0.05) to maintain that pressure. Upon completion of the reaction, all excess gases were removed, and the reactor was cooled until there were obtained 10.1 grams of copolymer.

INVENTIVE EXAMPLES 21–29

Preparation of Catalyst Components A18–A26

The procedure of Inventive Example 20 was followed in preparing Catalyst Components A18–A26 from the two compounds listed in Table 3.
Polymerization The procedure of Inventive Example 20 was also followed in carrying out the polymerization of ethylene and butene-1 with the exceptions that each of Catalyst Components A18–A26 was used in place of Catalyst Component A17 and that in Inventive Example 29 ethylene alone was homopolymerized. The amounts of the Catalyst Components used and the properties of the respective polymer products are indicated in Table 4.

Comparative Examples 10–11

Preparation of Catalyst Components B10–B11

Catalyst Component B10 was comprised of a toluene solution of tetrapropoxyzirconium. Catalyst Component B11 was comprised of a toluene solution of dicyclopentadienyldichlorozirconium.
Polymerization The procedure of Inventive Example 20 was followed in copolymerizing ethylene and butene-1 except that Catalyst Components B10 and B11 were used in place of Catalyst Component A17. The amounts of the Catalyst Components used and the properties of the respective polymer products are shown in Table 4.

TABLE 1

| Catalyst Component | Catalyst Composition Compound (A) | Compound (B) | molar ratio Compound (A) : Compound (B) |
|---|---|---|---|
| A05 | ZrBz$_4$ | indene | 1:4 |
| A06 | ZrBz$_4$ | cyclopentadiene | 1:4 |
| A07 | Zr(Ay)$_4$ | indene | 1:4 |
| A08 | Zr(Np)$_4$ | indene | 1:8 |
| A09 | TiBz$_4$ | indene | 1:4 |
| A10 | Ti(Np)$_4$ | indene | 1:4 |
| A11 | ZrBz$_3$Cl | cyclopentadiene | 1:8 |
| A12 | HfBz$_4$ | indene | 1:4 |
| A13 | HfBzCl$_3$ | cyclopentadiene | 1:4 |
| A14 | ZrBz$_4$ | indene | 1:12 |
| A15 | Zr(Np)$_4$ | indene | 1:6 |
| A16 | Zr(Np)$_4$ | bis-indenylethane | 1:6 |
| B01 | ZrBz$_4$ | — | — |
| B02 | Zr(Ay)$_4$ | — | — |
| B03 | Zr(Np)$_4$ | — | — |
| B04 | TiBz$_4$ | — | — |
| B05 | Ti(Np)$_4$ | — | — |
| B06 | ZrBz$_3$Cl | — | — |
| B07 | HfBz$_4$ | — | — |
| B08 | HfBzCl$_3$ | — | — |
| B09 | Cp$_2$ZrCl$_2$ | — | — |

Note:
Bz is benzyl.
Np is neophyl.
Ay is allyl.
Cp is cyclopentadienyl.

TABLE 2

| Catalyst Component | tension metal (mg) | yield (g) | catalyst activity (g/gMe) | Mw/Mn | MI (g/10 min) | density (g/cm³) | melting point (°C.) |
|---|---|---|---|---|---|---|---|
| Inventive Example | | | | | | | |
| 7  A05 | 1.5 | 45 | 30,000 | 4.5 | 0.95 | 0.9224 | 114.3 |
| 8  A06 | 1.3 | 54.6 | 42,000 | 4.1 | 7.9 | 0.9233 | 114.0 |
| 9  A07 | 1.4 | 35 | 25,000 | 4.2 | 1.9 | 0.9210 | 115.0 |
| 10  A08 | 1.6 | 56 | 35,000 | 4.8 | 2.1 | 0.9189 | 113.7 |
| 11  A09 | 1.5 | 58.5 | 39,000 | 4.6 | 3.2 | 0.9253 | 112.4 |
| 12  A10 | 1.4 | 44.8 | 32,000 | 4.4 | 1.4 | 0.9179 | 112.6 |
| 13  A11 | 1.6 | 68.8 | 43,000 | 4.5 | 5.7 | 0.9214 | 114.0 |
| 14  A12 | 1.7 | 34 | 20,000 | 4.7 | 0.3 | 0.9197 | 113.8 |
| 15  A13 | 1.4 | 37.8 | 27,000 | 4.2 | 5.9 | 0.9203 | 113.8 |
| 16  A14 | 1.5 | 48 | 32,000 | 3.9 | 1.6 | 0.9198 | 113.7 |
| 17  A15 | 1.5 | 51 | 34,000 | 4.1 | 0.3 | 0.9218 | 113.1 |
| 18  A15 | 1.4 | 52 | 37,000 | 4.6 | 0.1 | 0.9503 | 135.1 |
| 19  A16 | 2.5 | 60 | 24,000 | 10.0 | 1.9 | 0.9041 | 139.3 |
| Comparative Example | | | | | | | |
| 1  B01 | 1.5 | tr | — | — | — | — | — |
| 2  B02 | 1.4 | tr | — | — | — | — | — |
| 3  B03 | 1.3 | tr | — | — | — | — | — |
| 4  B04 | 1.5 | tr | — | — | — | — | — |
| 5  B05 | 1.6 | tr | — | — | — | — | — |
| 6  B06 | 1.3 | tr | — | — | — | — | — |
| 7  B07 | 1.4 | tr | — | — | — | — | — |
| 8  B08 | 1.5 | tr | — | — | — | — | — |
| 9  B09 | 1.5 | 63 | 45,000 | 2.1 | 23 | 0.9198 | 106.7 |

TABLE 3

| Catalyst Component | Compound (A) | Compound (B) | molar ratio (A):(B) |
|---|---|---|---|
| A17 | Zr(OPr)$_4$ | indene | 1:4 |
| A18 | Zr(OPr)$_4$ | indene | 1:2 |
| A19 | Zr(OPr)$_4$ | indene | 1:2 |
| A20 | Zr(OBu)$_4$ | indene | 1:2 |
| A21 | Zr(OPr)$_4$ | fluorene | 1:2 |
| A22 | Zr(OPr)$_4$ | cyclooctatetraene | 1:2 |
| A23 | Hf(OPr)$_4$ | indene | 1:2 |
| A24 | Ti(OBu)$_4$ | indene | 1:2 |
| A25 | Zr(OPr)$_3$Cl | indene | 1:2 |
| A26 | Zr(OPr)$_4$ | indene | 1:2 |
| B10 | Zr(OPr)$_4$ | — | — |
| B11 | Cp$_2$ZrCl$_2$ | — | — |

Note:
Bu is n-butyl.
Pr is n-propyl.

TABLE 4

| | Catalyst Component | Amount for polymerization transition metal (mg) | MAO/ modified Al | transition metal molar ratio | yield (g) | catalytic activity (g/gMe) | MI (g/10 min) | density (g/cm³) | DSC melting point (°C.) | Mw/Mn |
|---|---|---|---|---|---|---|---|---|---|---|
| Inventive Example | | | | | | | | | | |
| 20 | A17 | 1.6 | MAO | 1000 | 21 | 13,000 | 1.45 | 0.9281 | 115.3 | 5.3 |
| 21 | A1B | 1.5 | MAO | 1000 | 23 | 15,000 | 1.7 | 0.9220 | 114.9 | 4.9 |
| 22 | A19 | 1.5 | MAO | 500 | 12 | 8,000 | 0.9 | 0.9210 | 113.6 | 4.8 |
| 23 | A20 | 1.45 | MAO | 1000 | 25 | 17,000 | 1.2 | 0.9213 | 113.8 | 5.5 |
| 24 | A21 | 1.5 | MAO | 1000 | 18 | 12,000 | 1.0 | 0.9216 | 114.5 | 4.7 |
| 25 | A22 | 1.6 | MAO | 1000 | 14.5 | 9,000 | 2.1 | 0.9202 | 105.6 | 4.1 |
| 26 | A23 | 1.65 | MAO | 1000 | 11.6 | 7,000 | 0.1 | 0.9208 | 112.3 | 4.2 |
| 27 | A24 | 1.7 | MAO | 1000 | 20 | 12,000 | 0.9 | 0.9242 | 117.3 | 4.7 |
| 28 | A25 | 1.6 | MAO | 1000 | 30 | 19,000 | 1.0 | 0.9223 | 114.8 | 5.1 |
| 29 | A26 | 1.5 | MAO | 1000 | 37.5 | 25,000 | 0.8 | 0.957 | 132 | 4.7 |

TABLE 4-continued

| | Catalyst Component | Amount for polymerization | | MAO/ transition metal molar ratio | yield (g) | catalytic activity (g/gMe) | MI (g/10 min) | density (g/cm³) | DSC melting point (°C.) | Mw/Mn |
|---|---|---|---|---|---|---|---|---|---|---|
| | | transition metal (mg) | modified Al | | | | | | | |
| Comparative Example | | | | | | | | | | |
| 10 | B10 | 1.6 | MAO | 1000 | 0 | — | — | — | — | — |
| 11 | B11 | 1.4 | MAO | 1000 | 63 | 45,000 | 23 | 0.9198 | 106.7 | 2.1 |

As appears clear from the data shown in the above tables, the catalyst components provided by the invention can afford significantly high catalytic acitivity per transition metal used. The inventive catalyst components when combined with suitable promoters provide a catalyst composition useful in the homo- or co-polymerization of alpha-olefins, resulting in polymer products having increased molecular weight and broad molecular weight distribution, with a relatively narrow composition distribution for the copolymers obtained. Such copolymers typically of ethylene or propylene with other alpha-olefins which are produced with the use of the inventive catalyst components can be formed into sheets or films of high transparency without encountering objectionable mutual adhesion. The catalyst composition comprising the inventive components provides copolymers for example of ethylene and dienes which have a relatively high melting point despite their relatively low density and further provides block copolymers of olefins and polar monomers which have a relatively broad molecular weight distribution.

What is claimed is:

1. A catalyst component for use in the polymerization of olefinic hydrocarbons, said catalyst component comprising:

a compound (A) of the formula

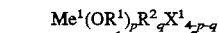

$$Me^1(OR^1)_p R^2_q X^1_{4-p-q}$$

wherein $R^1$ and $R^2$ each are hydrocarbon moieties independently selected from the group consisting of alkyl, alkenyl, aryl and aralkyl groups of 1-24 carbon atoms; $X^1$ is a halogen atom; $Me^1$ is Zr or Hf; $0 \leq p \leq 4$; $0 \leq q \leq 4$; and $0 < p+q \leq 4$; and an organocyclic hydrocarbon compound (B) having two or more conjugated double bonds and a total carbon number of 5-24, compound (B) being selected from the group consisting of (a) cyclopentadiene, (b) substituted cyclopentadienes, (c) indene, (d) substituted indenes and (e) cyclopolyenes having two or more cyclopentadienes or indenes according to (a), (b), (c) and (d), bonded together through an alkylene group of 2-8 carbon atoms.

2. A catalyst component according to claim 1 wherein the organocyclic compound (B) is a cyclic hydrocarbon compound having 2-4 conjugated double bonds.

3. A catalyst component according to claim 1 wherein the organocyclic compound (B) is a cyclic hydrocarbon compound having 2-3 conjugated double bonds.

4. A catalyst component according to claim 1 wherein the organocyclic compound (B) has a total carbon number of 5-12.

5. A catalyst component according to claim 1 wherein the organocyclic compound (B) is a cyclic hydrocarbon compound substituted with 1-6 hydrocarbon moieties.

6. A catalyst component according to claim 5 wherein said hydrocarbon moieties are selected from the group consisting of alkyl and aralkyl groups having 1-12 carbon atoms.

7. A catalyst component according to claim 1 wherein said organocyclic compound (B) is selected from the group consisting of cyclopolyenes and substituted cyclopolyenes having 7-24 carbon atoms.

8. A catalyst component according to claim 7 wherein said organocyclic compound (B) is selected from the group consisting of cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, azulene, ethylazulene, fluorene and methylfluorene.

9. A catalyst component according to claim 1 wherein the alkylene group has 2-3 carbon atoms.

10. A catalyst component according to claim 1 wherein the organocyclic compound (B) is selected from the group consisting of bisindenylethane, bis(4,5,6,7-tetrahydro-1-indenyl)-ethane, 1,3-propandinyl-bis-indene, 1,3-propandinyl bis (4,5,6,7-tetrahydro)indene, propylene bis(1-indene), isopropyl(1-indenyl)cyclopentadiene, diphenylmethylene(9-fluorenyl)cyclopentadiene and isopropylcyclopentadienyl-1-fluorene.

11. A catalyst component according to claim 1 wherein $R^1$ is a hydrocarbon moiety having 1-12 carbon atoms.

12. A catalyst component according to claim 1 wherein said compound (B) and said compound (A) are present in a compound (B):compound (A) molar ratio of 0.01:1 to 100:1.

13. A catalyst component according to claim 1 wherein said compound (B) and said compound (A) are present in a compound (B):compound (A) molar ratio of 0.1:1 to 10:1.

14. A catalyst for use in the polymerization of olefinic hydrocarbons, said catalyst comprising:

a catalyst component comprised of a compound (A) of the formula

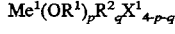

$$Me^1(OR^1)_p R^2_q X^1_{4-p-q}$$

wherein $R^1$ and $R^2$ each are hydrocarbon moieties independently selected from the group consisting of alkyl, alkenyl, aryl and aralkyl groups of 1-24 carbon atoms; $X^1$ is a halogen atom; $Me^1$ is Ti, Zr or Hf; $0 \leq p \leq 4$; $0 \leq q \leq 4$; and $0 \leq p+q \leq 4$;

an organocyclic hydrocarbon compound (B) selected from the group consisting of (a) cyclopentadiene, (b) substituted cyclopentadienes, (c) indene, (d) substituted indenes and (e) cyclopolyenes having two or more cyclopentadienes or indenes according to (a), (b), (c) and (d), bonded together through an alkenylene group of 2-8 carbon atoms; and a modified organoaluminum compound having 1-100 Al—O—Al bonds in the molecule derived from the reaction of an organoaluminum compound with water.

15. A catalyst according to claim 14 wherein said organoaluminum compound is a compound of the formula $R_nAlX_{3-n}$ wherein R is selected from the group consisting of alkyl, alkenyl, aryl and aralkyl groups having 1–18 carbon atoms; X is hydrogen or halogen atom; and $1 \leq n \leq 3$.

16. A catalyst according to claim 14 wherein said modified organoaluminum compound is the reaction product of said organoaluminum and water in a molar ratio of water to Al ranging from 0.25:1 to 1.2:1.

17. A catalyst according to claim 14 wherein the atomic ratio of aluminum in said modified organoaluminum compound to transition metal in said catalyst component is in the range from 1:1 to 100,000:1.

18. A catalyst according to claim 14 wherein $0 < p+q \leq 4$.

* * * * *